(12) United States Patent
Kurata et al.

(10) Patent No.: US 8,818,046 B2
(45) Date of Patent: Aug. 26, 2014

(54) IMAGE PROCESSING DEVICE, IMAGE PROCESSING METHOD, AND PROGRAM

(75) Inventors: Tohru Kurata, Saitama (JP); Atsushi Kimura, Toyko (JP); Naoki Hayashi, Chiba (JP); Akira Iwase, Tokyo (JP)

(73) Assignee: Sony Corporation, Tokyo (JP)

( * ) Notice: Subject to any disclaimer, the term of this patent is extended or adjusted under 35 U.S.C. 154(b) by 268 days.

(21) Appl. No.: 13/348,749

(22) Filed: Jan. 12, 2012

(65) Prior Publication Data

US 2012/0189167 A1    Jul. 26, 2012

(30) Foreign Application Priority Data

Jan. 21, 2011   (JP) ................. 2011-010783

(51) Int. Cl.
*G06K 9/00* (2006.01)
(52) U.S. Cl.
USPC ............. 382/107; 375/240; 375/240.16
(58) Field of Classification Search
CPC ......... G06T 7/20; G06T 7/2013; G06T 7/202; H04N 19/00587; H04N 19/0066; H04N 19/00593
USPC ................... 382/107; 375/240.16, 240
See application file for complete search history.

(56) References Cited

U.S. PATENT DOCUMENTS

| | | | |
|---|---|---|---|
| 6,549,650 B1 * | 4/2003 | Ishikawa et al. | 382/154 |
| 7,561,621 B2 * | 7/2009 | Itoh et al. | 375/240.16 |
| 8,199,805 B2 * | 6/2012 | Numata et al. | 375/240 |
| 8,295,551 B2 * | 10/2012 | Lertrattanapanich et al. | 382/107 |
| 8,351,511 B2 * | 1/2013 | Mitsuya et al. | 375/240.16 |
| 8,401,318 B2 * | 3/2013 | Tetsukawa et al. | 382/236 |
| 2004/0258154 A1 * | 12/2004 | Liu et al. | 375/240.16 |
| 2005/0180606 A1 * | 8/2005 | Park et al. | 382/107 |
| 2005/0259739 A1 * | 11/2005 | Nakamura et al. | 375/240.16 |
| 2005/0270385 A1 * | 12/2005 | Shioya et al. | 348/239 |
| 2006/0285596 A1 * | 12/2006 | Kondo et al. | 375/240.16 |
| 2007/0183505 A1 * | 8/2007 | Shimizu et al. | 375/240.16 |

(Continued)

FOREIGN PATENT DOCUMENTS

| | | | |
|---|---|---|---|
| JP | 2005-333396 A | | 2/2005 |
| JP | 2009-219082 A | | 9/2009 |
| JP | WO2010/109636 | * | 9/2010 |

OTHER PUBLICATIONS

Tekalp et al: "image sequences" Wiley Encyclopedia of Electrical and Electronics Engineering, John Wiley&Sons, Inc, Jan. 1, 1999, pp. 1-43.*

*Primary Examiner* — Stephen R Koziol
*Assistant Examiner* — Shaghayegh Azima
(74) *Attorney, Agent, or Firm* — Sony Corporation

(57) ABSTRACT

An image processing device, includes: a first motion vector calculation unit calculating a motion vector of a target block regarding the target block made with a plurality of pixels set up in a target image by detecting a block position maximally correlated with the target block in a search range set up in a reference image; a second motion vector calculation unit calculating a motion vector between the target image and the reference image from the motion vector for each of a plurality of target blocks set up in the target image; and a predictive motion vector setup unit setting up a predictive motion vector using a motion vector calculated between images in further past than the target image. The first motion vector calculation unit sets up the search range on the reference image based on a position of the target block and the predictive motion vector.

15 Claims, 12 Drawing Sheets

(56) References Cited

U.S. PATENT DOCUMENTS

| | | | |
|---|---|---|---|
| 2008/0159652 A1* | 7/2008 | Shimizu | 382/284 |
| 2009/0103621 A1* | 4/2009 | Numata et al. | 375/240.16 |
| 2009/0116555 A1* | 5/2009 | Oishi | 375/240.16 |
| 2009/0213937 A1* | 8/2009 | Kawase et al. | 375/240.16 |
| 2009/0232216 A1* | 9/2009 | Kurata | 375/240.16 |
| 2009/0257498 A1* | 10/2009 | Kurata | 375/240.16 |
| 2009/0285301 A1* | 11/2009 | Kurata | 375/240.16 |
| 2010/0020244 A1* | 1/2010 | Mitsuya et al. | 348/699 |
| 2010/0027900 A1* | 2/2010 | Tetsukawa et al. | 382/236 |
| 2010/0079605 A1* | 4/2010 | Wang et al. | 348/208.4 |
| 2010/0149358 A1* | 6/2010 | Shioya et al. | 348/218.1 |
| 2010/0201828 A1* | 8/2010 | Mitsuya et al. | 348/208.6 |
| 2010/0208820 A1* | 8/2010 | Huang et al. | 375/240.16 |
| 2010/0253763 A1* | 10/2010 | Shioya et al. | 348/36 |
| 2011/0002509 A1* | 1/2011 | Nobori et al. | 382/103 |
| 2011/0013840 A1* | 1/2011 | Iwasaki et al. | 382/173 |
| 2011/0170605 A1* | 7/2011 | Sato et al. | 375/240.16 |
| 2011/0228853 A1* | 9/2011 | Suzuki et al. | 375/240.16 |
| 2011/0228987 A1* | 9/2011 | Iwasaki et al. | 382/107 |
| 2011/0255747 A1* | 10/2011 | Iwasaki et al. | 382/103 |
| 2011/0274175 A1* | 11/2011 | Sumitomo | 375/240.16 |
| 2012/0013796 A1* | 1/2012 | Sato | 348/441 |
| 2012/0020524 A1* | 1/2012 | Ishikawa | 382/103 |

\* cited by examiner

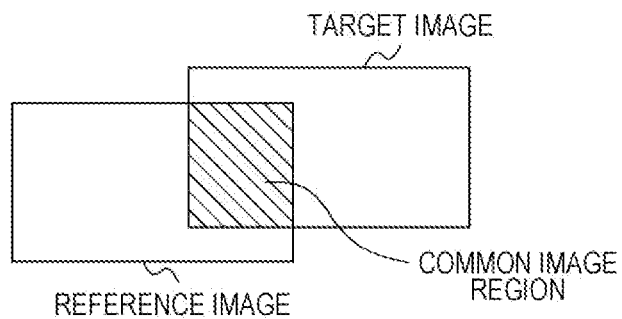
FIG. 2A
(PRIOR ART)
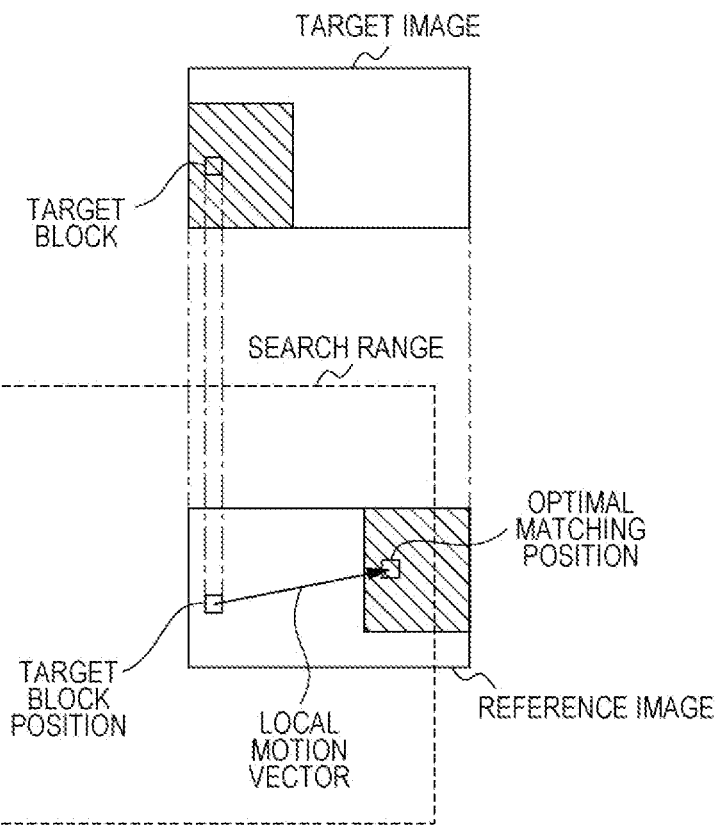
FIG. 2B
(PRIOR ART)
FIG. 2C
(PRIOR ART)

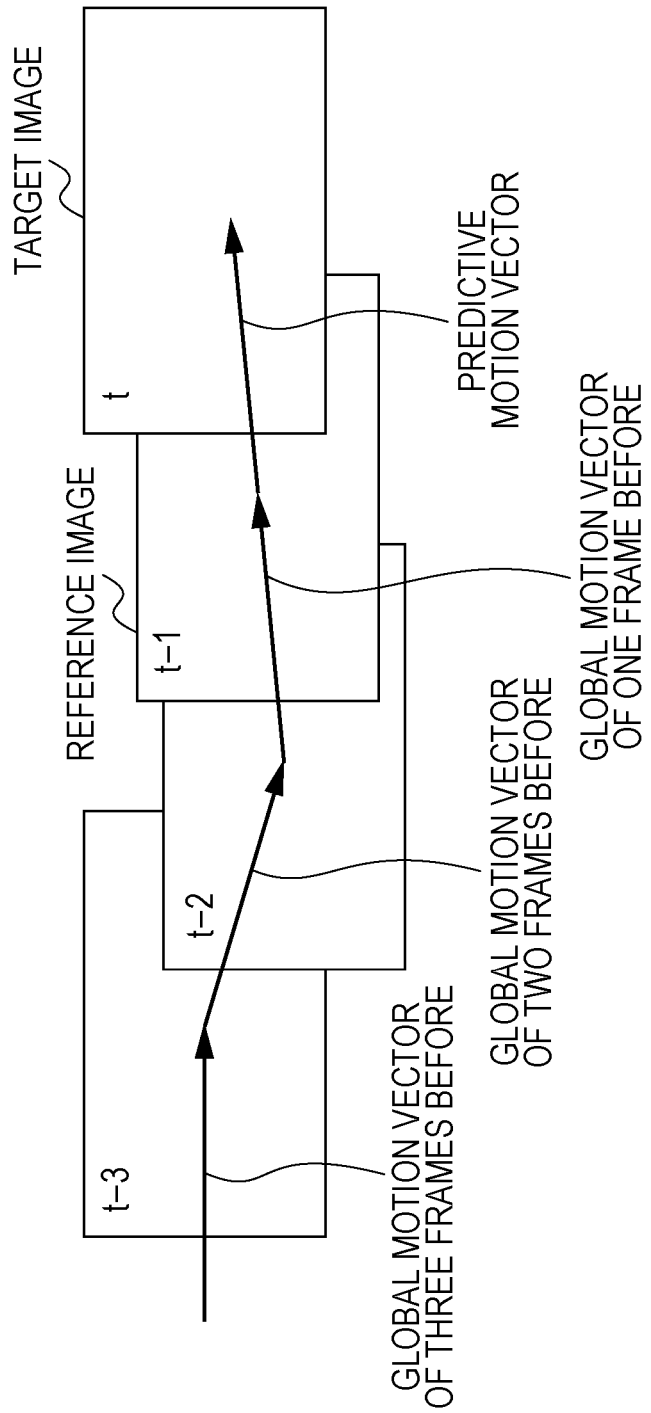

IMAGE PROCESSING DEVICE, IMAGE PROCESSING METHOD, AND PROGRAM

BACKGROUND

The present technology relates to an image processing device, an image processing method, and a program. Specifically, it enables to optimize a search range when calculating a motion vector between images picked up continuously.

In the past, generation of one sheet of a wide angle image (panoramic image) is carried out by linking, for example, strip images cut out of a plurality of sheets of picked up images obtained by carrying out image pickup while moving an image pickup direction of an image pickup device. A setup of a cut out region is carried out, by calculating a motion vector between picked up images, so as to make images in a linkage portion as a continuous image based on the calculated motion vector.

FIG. 1 illustrates a behavior in the past, and shows a positional relationship of four sheets of picked up images from time t−3 to time t obtained by carrying out image pickup while moving in an image pickup direction of an image pickup device.

In a case of obtaining an inter-image motion vector (hereinafter, referred to as a global motion vector) between an image at time t−1 (reference image) and an image at time t (target image), an equidistant range up, down, left, and right from a center of the reference image is defined as a search range. By judging a degree of matching with the reference image in this search range, a motion vector in a location of a highest degree of matching is defined as a global motion vector. In calculation of the global motion vector, in a case of directly matching the entire target image with the entire reference image, a matching image region is only in a part of the images and it is difficult to accurately calculate the global motion vector. Accordingly, as in Japanese Unexamined Patent Application Publication No. 2009-219082, for example, calculation of a global motion vector is carried out by dividing an image into several small blocks, and after calculating a motion vector (hereinafter, referred to as a local motion vector) for each block, by processing them integrally.

FIGS. 2A, 2B, and 2C illustrate a relationship of a block and a local motion vector. A positional relationship shown in FIG. 2A represents a relationship of a target image and a reference image on the basis of absolute coordinates, and FIGS. 2B and 2C represent it on the basis of images.

When target blocks to calculate a local motion vector are set up on a target image, in a related art, a search range is provided that is equidistant up, down, left, and right from an identical position on the reference image as a center. In this search range, matching of the target blocks with the reference image is carried out in series, and relative coordinates of an optimal matching position, which is a most highly correlated position, and a position of a target block shows a local motion vector.

The target blocks may be set up as each of the regions into which the entire screen is divided simply at equal intervals, and may also be as divided regions allowing an overlap. In addition, feature points may also be extracted from edge information and the like in advance to define only a limited area including them as designated blocks. Even when setting up a search range as in FIG. 2C, a region having no image subjected to matching makes no sense. Accordingly, actually, as shown in FIG. 3B, a search range is set up.

The target image and the reference image have consistent images only in a common image region (region shown with hatched lines in FIGS. 2A, 2B, and 2C and FIGS. 3A and 3B). Accordingly, among local motion vectors in all blocks, only those belonging to the common image region are extracted from reliability information, such as a matching degree. Further, by integrally processing one or a plurality of highly reliable local motion vectors thus extracted, a global motion vector is calculated. By shifting the target image based on the global motion vector obtained in such a manner to link it with the reference image, a wide angle image can be generated with the images in a linkage portion to be continuous. As a manner to calculate a global motion vector from local motion vectors, a method of combining, for example, affine conversion and a RANSAC (random sample consensus) algorithm and the like are recognized widely.

SUMMARY

In a case of setting up a search range equidistant up, down, left, and right from a position identical to a target block on a reference image as a center, in order to cover originally intended displacement, a wide region has to be set up as the search range. However, in order to broaden the search range, the scale of hardware has to be enlarged and the processing time also turns out to increase. In addition, as the processing time increases, the frame rate has to be lowered, and when the frame rate is low, displacement between frames turns out to be large, so that the search range has to be even wider. In addition, since the displacement between frames is large and temporally distant, in a case of linking images, there is also a possibility that the images in the linkage portion turn out not to be smooth.

Accordingly, in a case of giving priority to image quality of a wide angle image, a speed (for example, a swing speed, a parallel displacement rate, and the like of an image pickup device) to move an image pickup direction of an image pickup device has to be restricted. In addition, in a case of giving priority to usability by allowing a certain speed or faster, degradation of image quality of a wide angle image has to be allowed.

It is desirable to provide an image processing device and an image processing method capable of calculating a motion vector without setting up a redundantly wide search range.

An image processing device according to an embodiment of the present technology includes: a first motion vector calculation unit calculating a motion vector of a target block regarding the target block made with a plurality of pixels set up in a target image by detecting a block position maximally correlated with the target block in a search range set up in a reference image; a second motion vector calculation unit calculating a motion vector between the target image and the reference image from the motion vector for each of a plurality of target blocks set up in the target image; and a predictive motion vector setup unit setting up a predictive motion vector using a motion vector calculated between images in further past than the target image. The first motion vector calculation unit sets up the search range on the reference image based on a position of the target block and the predictive motion vector.

In the embodiment of the present technology, a motion vector of a target block is calculated by detecting a block position maximally correlated with the target block in a search range set up in a reference image regarding the target block made with a plurality of pixels set up in a target image. A motion vector between the target image and the reference image is calculated from the motion vector for each of a plurality of target blocks set up in the target image. A predictive motion vector is set up by adding a function value as an offset component to a motion vector of one frame before or two or more motion vectors, for example, calculated between images in further past than the target image or a linear prediction result using the motion vector(s). The function value is a function value of a function approximating a motion to move the image pickup direction, and a function value of a constant value, a function value of a function linearly changing relative to time, or a function value of a function parabolically changing relative to time is used. A sign of an initial value of the function value is set up based on an operational signal in accordance with a user operation. Further, in a case that the motion detection sensor detecting at least any one of an angular velocity, acceleration, and magnetism is provided, a setup of the predictive motion vector is carried out using an output of the motion detection sensor. A block position on the reference image equivalent to a position of the target block on the target image is moved based on the predictive motion vector set up in such a manner, and the search range is set up on the basis of a maximally correlated block position.

An image processing method according to another embodiment of the present technology includes: calculating a motion vector of a target block regarding the target block made with a plurality of pixels set up in a target image by detecting a block position maximally correlated with the target block in a search range set up in a reference image; calculating a motion vector between the target image and the reference image from the motion vector for each of a plurality of target blocks set up in the target image; and carrying out a setup of a predictive motion vector using a motion vector calculated between images in further past than the target image. The search range is set up on the reference image based on a position of the target block and the predictive motion vector.

A program according to a still another embodiment of the present technology to make a computer execute the procedures, includes: calculating a motion vector of a target block regarding the target block made with a plurality of pixels set up in a target image by detecting a block position maximally correlated with the target block in a search range set up in a reference image; calculating a motion vector between the target image and the reference image from the motion vector for each of a plurality of target blocks set up in the target image; carrying out a setup of a predictive motion vector using a motion vector calculated between images in further past than the target image; and setting up the search range on the reference image based on a position of the target block and the predictive motion vector.

The program of an embodiment of the present technology is a program possible to be provided by a storage medium or a communication medium, like a storage medium, such as an optical disk, a magnetic disk, and a semiconductor memory, for example, or a communication medium, such as a network, provided in a computer readable format to a general purpose computer system possible to execute various program codes, for example. Processing in accordance with a program is provided on a computer system by providing such a program in a computer readable format.

According to an embodiment of the present technology, in a case of calculating a motion vector of a target block made with a plurality of pixels set up in a target image, a predictive motion vector is set up using a motion vector calculated between images in the further past than the target image. Further, based on the position of the target block and the predictive motion vector, a search range is set up on the reference image. Accordingly, a redundantly wide search range does not have to be set up, and a motion vector in a target block can be calculated immediately even without expanding the scale of hardware.

BRIEF DESCRIPTION OF THE DRAWINGS

FIGS. 2A, 2B, and 2C illustrate a relationship of a block and a local motion vector;
FIG. 5 illustrates a search range setup behavior on the basis of absolute coordinates.

DETAILED DESCRIPTION OF EMBODIMENTS

A description is given below to embodiments of the present technology. In an embodiment of the present technology, in a case of carrying out matching process between images to calculate a motion vector (global motion vector) between temporally continuous two sheets of images, efficient calculation of a motion vector is enabled by making a setup of a search range appropriate. Embodiments of the present technology are described in the following order. A case of moving an image pickup direction by swinging an image pickup device is also described.

1. Configuration of Image Pickup Device
2. Search Range Setup Behavior
2-1. First Predictive Motion Vector Setup Behavior
2-2. Second Predictive Motion Vector Setup Behavior
2-3. Third Predictive Motion Vector Setup Behavior
3. Wide Angle Image Generation Behavior <1. Configuration of Image Pickup Device>

Figure 1:
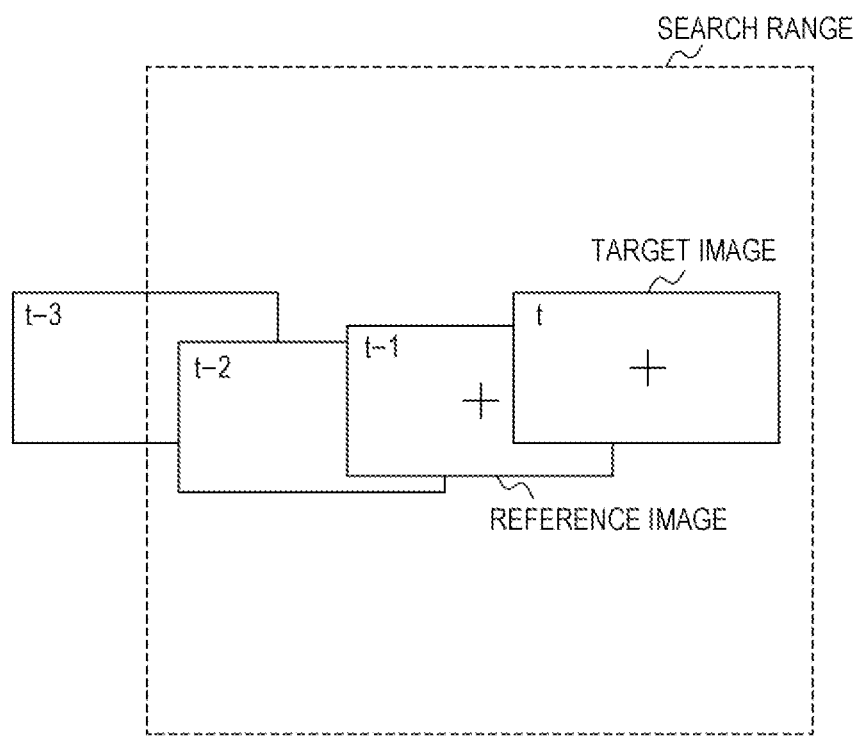
FIG. 1 illustrates a behavior in the past.
Figure 3A:
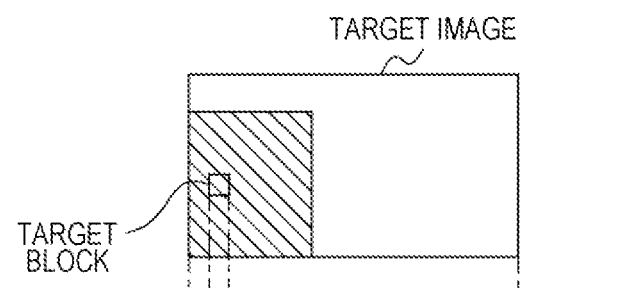
FIGS. 3A and 3B illustrate a search range set up actually.
Figure 3B:
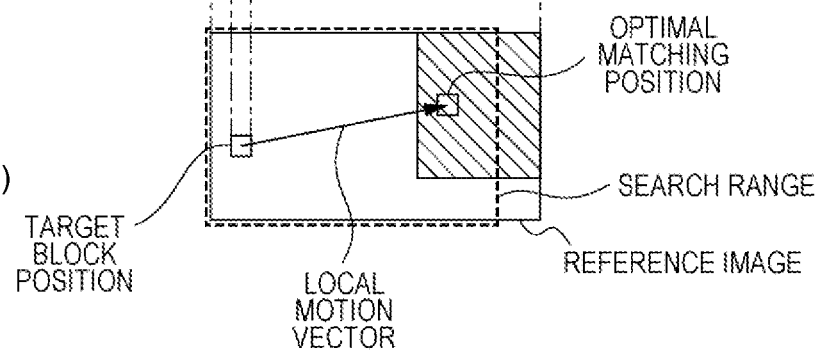
Figure 4:
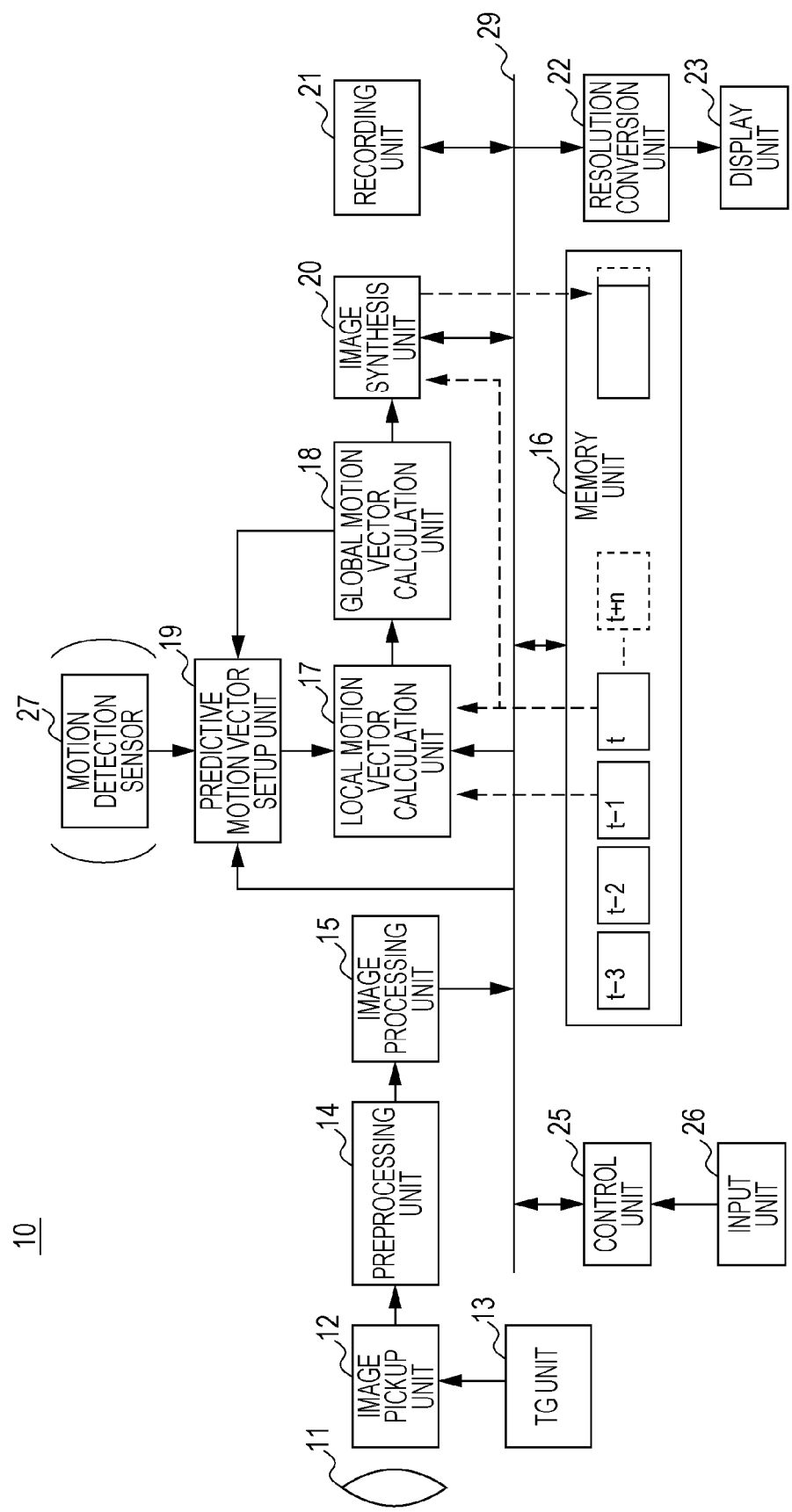
FIG. 4 exemplifies a configuration in a case of applying an image processing device to an image pickup device.

FIG. 4 exemplifies a configuration in a case of applying an image processing device of an embodiment of the present technology to an image pickup device. An image pickup device 10 has image pickup optics 11, an image pickup unit 12, a timing signal generation unit (TG unit) 13, a preprocessing unit 14, an image processing unit 15, a memory unit 16, a local motion vector calculation unit 17, a global motion vector calculation unit 18, a predictive motion vector setup unit 19, an image synthesis unit 20, a recording unit 21, a resolution conversion unit 22, a display unit 23, a control unit 25, and an input unit 26. In the image pickup device 10, via a bus 29, the image processing unit 15, the memory unit 16, the local motion vector calculation unit 17, the predictive motion vector setup unit 19, the image synthesis unit 20, the recording unit 21, the resolution conversion unit 22, and the control unit 25 are connected. The image pickup device 10 may also be provided with a motion detection sensor 27.

The image pickup optics 11 are configured with a lens as a main component, and form an optical image of an object, not shown, on a light receiving surface of the image pickup unit 12.

The image pickup unit 12 is configured using a solid state image pickup element, such as a CMOS and a CCD. The image pickup unit 12 is connected with the timing signal generation unit 13. The image pickup unit 12 drives an image pickup element based on a timing signal generated in the timing signal generation unit 13, and generates an image pickup signal in accordance with an optical image formed on the light receiving surface by the image pickup optics 11 to output it to the preprocessing unit 14.

The preprocessing unit 14 carries out correlated double sampling process (CDS), analog amplification process, or the like to an analog image pickup signal outputted from the image pickup unit 12 for A/D conversion processing of the image pickup signal after processing to output it to the image processing unit 15.

The image processing unit 15 carries out camera signal processing and a variety of correction processing to image data outputted from the preprocessing unit 14 to convert the image data into a signal in a predetermined format, such as brightness data and color difference data. The image data obtained by carrying out a variety of image processing in the image processing unit 15 is stored in the memory unit 16.

The memory unit 16 is used as a working memory to temporarily store a picked up image and a wide angle image. The memory unit 16 stores image data outputted from the image processing unit 15 and image data synthesis-processed in the image synthesis unit 20 described later.

The local motion vector calculation unit 17 is a first motion vector calculation unit, and by carrying out matching process for each target block in series between a target image and a reference image, calculates a motion vector for each target block. In the following description, a motion vector calculated for each target block is referred to as a local motion vector.

The local motion vector calculation unit 17 moves a position of a block on the reference image equivalent to a position of a target block on the target image based on the predictive motion vector set up in the predictive motion vector setup unit 19 described later. The local motion vector calculation unit 17 sets up a search range on the basis of a position of the block after movement to carry out matching process with the target block in the search range. Further, the local motion vector calculation unit 17 detects a position of the block in the search range maximally correlated with the target block in the matching process to calculate a local motion vector from a position of the detected block and the position of the target block.

The global motion vector calculation unit 18 is a second motion vector calculation unit and calculates a motion vector between temporally continuous two sheets of images. In the following description, a motion vector calculated between images is referred to as a global motion vector.

The global motion vector calculation unit 18 calculates a global motion vector based on the local motion vector calculated in the local motion vector calculation unit 17. For example, it calculates a global motion vector using all of the plurality of equally weighed local motion vectors obtained for a target frame. In addition, as in Japanese Unexamined Patent Application Publication No. 2009-219082, respective reliability index values of a plurality of local motion vectors for a target frame is calculated to normalize the reliability index values, and for example, a weighting factor of not less than 0 and not more than 1 is set up to each local motion vector. Further, weighting may also be carried out in accordance with the weighting factor set up for each local motion vector to calculate a global motion vector from the local motion vectors after weighting. In order to reduce a load of operating the global motion vector, the normalized reliability index values may also be compared with a threshold to use the weighting factors by binarizing them.

The predictive motion vector setup unit 19 carries out a setup of a predictive motion vector using a global motion vector detected between images in the further past than the target image. The predictive motion vector setup unit 19 may also carry out a setup of a predictive motion vector by adding not only the global motion vector but also a function value as an offset component. In this case, the predictive motion vector setup unit 19 uses a function value of a function that approximates a swing behavior of the image pickup device 10. The predictive motion vector setup unit 19 informs the local motion vector calculation unit 17 of the setup predictive motion vector.

The image synthesis unit 20 determines partial images used for generation of a wide angle image to generate a wide angle image by linking the partial images. The image synthesis unit 20 sets up image regions to be used as the partial images based on the global motion vector in determination of partial images so as to make the images in the linkage portions as continuous images. The image synthesis unit 20 controls positions of writing image data of the partial images in image synthesis to generate a wide angle image by linking partial images so as to, for example, make image data of a wide angle image to be in a state of being recorded in the memory unit 16 in a predetermined order.

The recording unit 21 records the image data of a wide angle image stored in the memory unit 16 in a recording medium, such as a memory card.

The resolution conversion unit 22 carries out resolution conversion to make the image stored in the memory unit 16 or the image recorded in the recording unit 21 to be image data suited to the resolution of the display unit 23.

The display unit 23 is configured using a liquid crystal display element, an organic electroluminescent display element, or the like. The display unit 23 displays a picked up image and a wide angle image based on the image data supplied from the resolution conversion unit 22. The display unit 23 also carries out display of a camera through image, a setup of the image pickup device 10, menu display related to an operation, and the like.

The control unit 25 is connected to the input unit 26. The input unit 26 accepts an operational input from a user, and is provided with various operation keys, such as a power switch, a shutter key, and a zoom key, operation keys to carry out menu display, selection and various setups of menu items, and the like. The input unit 26 outputs an operational signal in accordance with a user operation to the control unit 25.

The control unit 25 is configured using a microcomputer or the like, and executes a stored program to control each unit so as to make a behavior of the image pickup device 10 to be a behavior in accordance with the user operation. Further, in a case of carrying out a setup of a predictive motion vector using a global motion vector and a function value in the predictive motion vector setup unit 19, the control unit 25 carries out a behavior as a function value setup unit and generates a function value to supply it to the predictive motion vector setup unit 19.

<2. Search Range Setup Behavior>

The image pickup device 10 carries out matching process per block in order to obtain a global motion vector, which is a motion vector between temporally continuous two sheets of images, to calculate local motion vectors. In matching process, by using a predictive motion vector, a setup of a search range is optimized and calculation of a local motion vector is carried out efficiently.

Figure 6A:
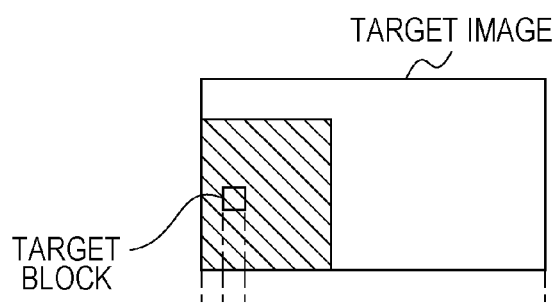
FIGS. 6A and 6B illustrate a search range setup behavior.
Figure 6B:
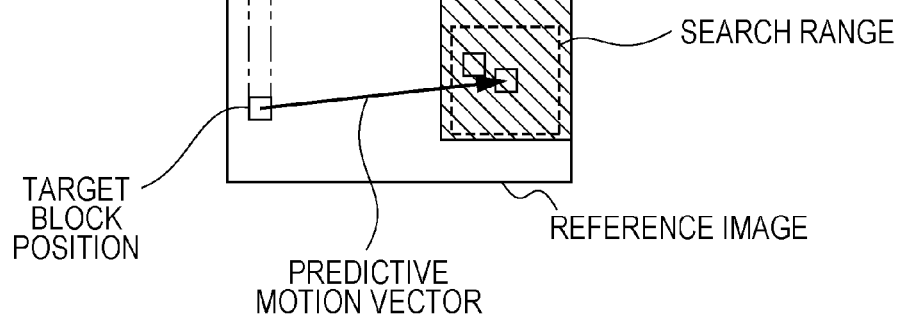

FIG. 5 illustrates a search range setup behavior on the basis of absolute coordinates. The image pickup device 10 sets up a predictive motion vector using, for example, one or not less than two inter-image motion vectors calculated in the past, which is already recognized information. In addition, the image pickup device 10 can detect a local motion vector even when a search range narrower than a range in the past is set by setting up the search range based on a predictive motion vector. That is, without defining a redundantly wide range as a search range, the image pickup device 10 can detect a motion vector, thereby enabling improvement in a processing speed and detection of a large movement vector in a high resolution image. The image pickup device 10 sets up, as specifically shown in FIGS. 6A and 6B, a range equidistant up, down, left, and right on the basis of a position after movement on the reference image as a search range by moving a position of a target block in accordance with the predictive motion vector on the basis of image. In a case that a bias of an error in the predictive motion vector is already recognized, the search range is moved in accordance with the bias.

<2-1. First Predictive Motion Vector Setup Behavior>

Then, a description is given to a first predictive motion vector setup behavior. A variety of algorithms is used as a manner to predict a value in the future from a value in the past, and the algorithm most typically used is linear prediction.

Expression (1) is an expression showing linear prediction. Here, a predictive motion vector v(t) at time t can be calculated from Expression (1), where the time is defined as "t" (a unit for t is a number of frames), a motion vector in the past observed in advance as "x(t)", and a predictive factor as "$a_i$".

$$v(t) = -\sum_{i=1}^{p} a_i x(t-i) \quad (1)$$

In a case that the time when starting a swing behavior is "t=0", a vector value before starting the swing behavior "t<0" is defined as "x(t)=0".

Here, in generation of a wide angle image, whereas a user intentionally swings the camera, the frame rate assumed by the system is from 5 to 15 frames/second, approximately. Accordingly, a gap between the time frequency component of an object to be predicted and a time interval of the sampling is large and there is a possibility of not establishing a prediction. In addition, when an object demanding the prediction is, for example, in a beginning period of swinging and a variation in the swing speed is large, almost no sample in the past is obtained, so that effectivity of linear prediction is not utilized.

Accordingly, in a case that the image pickup device 10 can calculate a motion vector at a high frame rate and the swing behavior of the image pickup device 10 is at a constant speed, the predictive motion vector setup unit 19 can set up a predictive motion vector accurately by using linear prediction shown in Expression (1).

Figure 7:
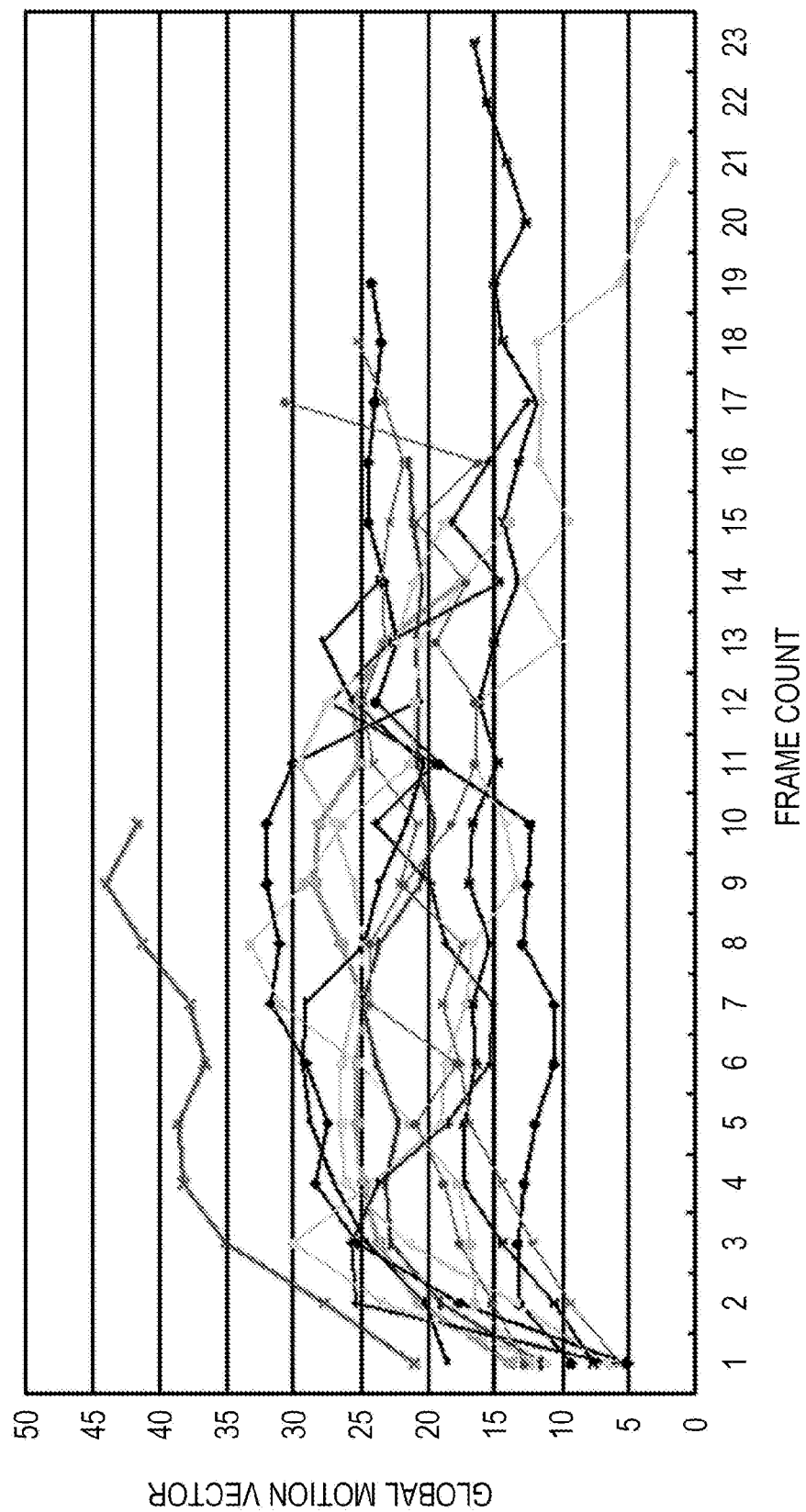
FIG. 7 illustrates a motion vector variation between frames per person.

A swing behavior to generate a wide angle image generally has a large variation in a global motion vector between frames in a beginning period of swinging, and a difference of a person also makes a motion vector variation between frames different. FIG. 7 illustrates a difference in the global motion vectors between frames in a beginning period of swinging per person carrying out a swing behavior. As apparent from FIG. 7, the difference in global motion vectors between frames in a beginning period of swinging is large, and it is also apparent that a variation due to the difference of a person is large.

With that, the predictive motion vector setup unit 19 sets up a predictive motion vector by adding a function value to the inter-image motion vector as an offset component. For example, by adding a function f(t) dependent only on the time t as shown in Expression (2) to the linear prediction shown in Expression (1), and further by using Expression (3), where a number p of frames of linear prediction is "1" and the predictive factor $a_i$ is "−1", a setup of a predictive motion vector v(t) is carried out.

$$v(t) = f(t) - \sum_{i=1}^{p} a_i x(t-i) \quad (2)$$

$$v(t)=f(t)+x(t-1) \quad (3)$$

In addition, a motion vector w(t) of a component vertical to the swing direction of the image pickup device 10 is calculated using Expression (4) or Expression (5). A global motion vector in the past observed in advance is defined as "y(t)". The component vertical to the swing direction is almost "0" and can be covered sufficiently with a narrower search range compared to a search range in the swing direction. The vector value before starting swing "t<0" is defined as "y(t)=0".

$$w(t)=y(t-1) \quad (4)$$

$$w(t)=0 \quad (5)$$

Figure 8:
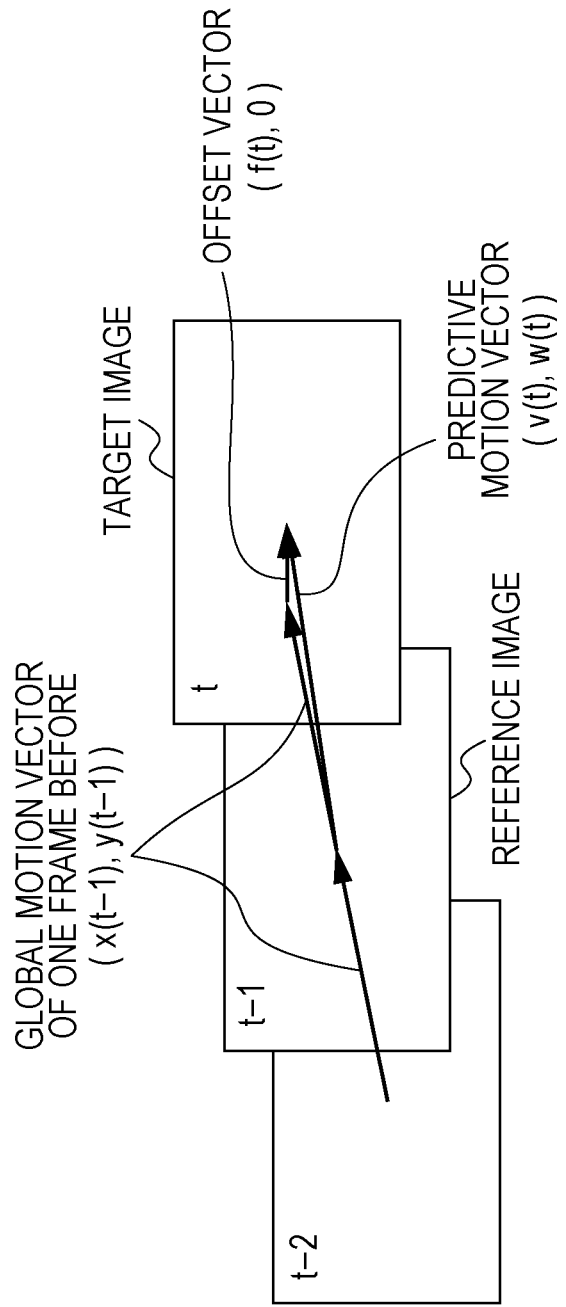
FIG. 8 illustrates a picture of predicting a vertical component in a swing direction.

In such a manner, in a case that the component vertical to the swing direction is almost "0", a picture of the prediction of the swing direction by Expression (3) and the prediction of the vertical component of the swing direction by Expression (5) becomes as shown in FIG. 8. That is, the predictive motion vector (v(t), w(t)) is obtained by adding an offset component due to f(t) only in the swing direction to the global motion vector (x(t−1), y(t−1)) observed in an immediately previous frame.

Figure 9A:
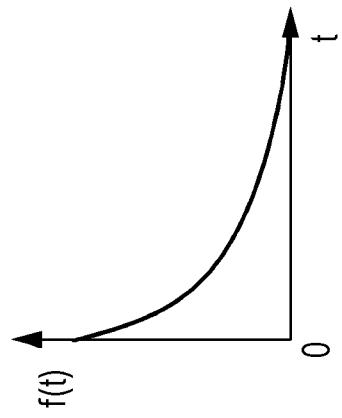
FIGS. 9A, 9B, and 9C illustrate an offset component in a first predictive motion vector setup behavior.
Figure 9B:
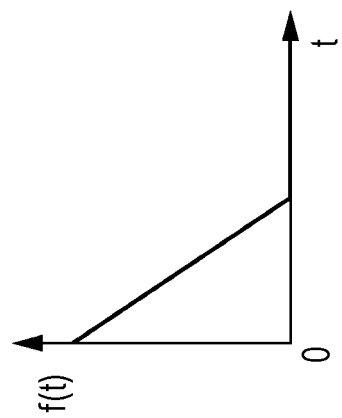
Figure 9C:
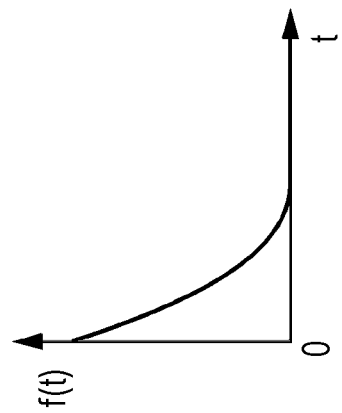

FIGS. 9A, 9B, and 9C exemplify an offset component of prediction relative to a previous value. FIG. 9A illustrates a general property when a user begins to swing an image pickup device. Suppose that a swing behavior is started after pressing a shutter, it can be imagined that a general behavior of swinging an image pickup device starts from a speed of "0", and then immediately increases up to a certain speed, and after maintaining a constant speed after that, lowers the speed relatively moderately. In other words, the offset component f(t) in a beginning period of swinging is expected to be in a shape of starting from a certain high value and asymptotic to "0" smoothly, and becomes in the property shown in FIG. 9A.

Accordingly, the control unit 25 calculates an offset component f(t) corresponding to a lapse of time with a function obtained by approximating a swing behavior, which is a property of FIG. 9A, for example, a property shown in FIG. 9B obtained by approximating with a function linearly changing relative to the time. The control unit 25 may also calculate an offset component f(t) corresponding to a lapse of time with a function obtained by approximating a swing behavior, which is a property of FIG. 9A, for example, a property shown in FIG. 9C obtained by approximating with a function parabolically changing relative to the time. In such a manner, the control unit 25 carries out calculation of a function value, and the predictive motion vector setup unit 19 sets up a predictive motion vector using a global motion vector calculated between images in the past and a function value of a function linearly changing relative to the time or a function parabolically changing relative to the time. The predictive motion vector setup unit 19 also carries out linear prediction using one or not less than two global motion vectors calculated between images in the past. As the predictive motion vector setup unit 19 calculates the property of FIG. 9A by approximated with a straight line, the operation costs can be suppressed lower.

Further, an initial value of the offset component f(t) at the time t=0, that is, f(0) becomes a different value depending on the swing direction. For example, in a case of an opposite swing direction, a sign of the initial value becomes opposite. Accordingly, as the swing direction is selected by a user in advance or the swing direction is sensed by a sensor, such as a gyro, the sign of an initial value can be set up by corresponding to the swing direction. An optimum value of the offset component f(t) value at the time t=0 may be obtained in advance by an experiment or the like.

<2-2. Second Predictive Motion Vector Setup Behavior>

In the first predictive motion vector setup behavior, a description is given to a method of calculating a predictive motion vector of a present frame using a global motion vector in the past and a function value based on a lapse of time since the beginning of swinging. Then, in a second predictive motion vector setup behavior, a description is given to a method of using Expression (6), which is simplified more than Expression (3).

$$v(t)=f+x(t-1) \tag{6}$$

In Expression (6), a fixed value (equivalent to a constant function value) is constantly added to a previous value as an offset component. For example, a value at time (0) in Expression (3) is defined as an offset component of a fixed value.

Figure 10A:
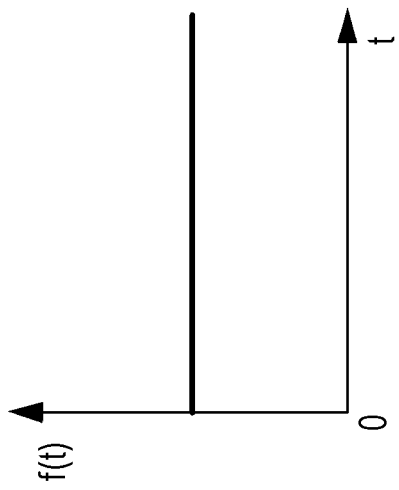
FIGS. 10A and 10B illustrate an offset component in a second predictive motion vector setup behavior.
Figure 10B:
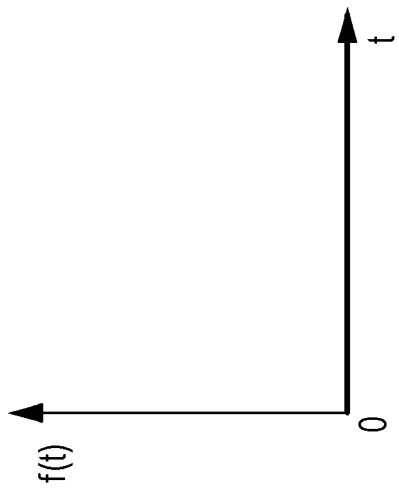

FIGS. 10A and 10B illustrate a case that the offset component becomes a fixed value, for example, FIG. 10A illustrates a case that the swing behavior is a constant speed motion. In a case of approximating a constant speed motion, the control unit 25 constantly defines the offset component as "0" not depending on the time. FIG. 10B illustrates a case that the swing behavior is a constant acceleration motion. In a case of approximating a constant acceleration motion, the control unit 25 defines the offset component as a constant value, which is not "0".

The predictive motion vector setup unit 19 carries out linear prediction using one of global motion vectors calculated between images in the past. The predictive motion vector setup unit 19 may also carry out linear prediction using two or more global motion vectors calculated between images in the past.

An initial value of the offset component f(t) at the time t=0, that is, f(0) allows a swing direction to be selected by a user in advance similar to the first search range setup behavior. Alternatively, the sign of an initial value can be set up by corresponding to the swing direction by sensing the swing direction with a sensor, such as a gyro. An optimum value of the offset component f(t) value at the time t=0 is obtained in advance by an experiment or the like. Further, it is also possible to use Expression (7) obtained by deleting the previous value from Expression (6).

$$v(t)=f \tag{7}$$

By setting up a predictive motion vector in such a manner, calculation of a predictive motion vector can be carried out easily compared to the first predictive motion vector setup behavior.

<2-3. Third Predictive Motion Vector Setup Behavior>

In the first predictive motion vector setup behavior and the second predictive motion vector setup behavior, a description is given to methods of calculating a predictive motion vector using an image generated in the image pickup device 10. However, the predictive motion vector is not limited to the cases of calculating using an image. For example, in a case that the image pickup device 10 is provided with the motion detection sensor 27 to detect a motion, the predictive motion vector setup unit 19 is enabled to set up a predictive motion vector efficiently based on a motion detected in the motion detection sensor 27.

As the motion detection sensor 27, any of a gyro (angular velocity sensor), an acceleration sensor, and an electronic compass (magnetic sensor) is used or they are used in combination. Since the sampling rate of motion detection by the motion detection sensor 27 is not dependent on the time t of the frame rate of an image, time u different from the frame rate is used as an argument.

Expressions (8) through (10) are expressions to calculate a predictive motion vector v(t) using an offset component g(u) based on a motion detected in the motion detection sensor 27. Expression (8) shows a case of using the linear prediction shown in Expression (2) and the motion detection sensor 27 in combination. Expression (9) is equivalent to a case of replacing the function f(t) dependent only on the time t in Expression (3) with a motion detection result in the motion detection sensor 27. Further, Expression (10) is equivalent to a case of being based only on a motion detection result in the motion detection sensor 27.

$$v(t) = g(u) - \sum_{i=1}^{P} a_i x(t-i) \tag{8}$$

$$v(t)=g(u)+x(t-1) \tag{9}$$

$$v(t)=g(u) \tag{10}$$

In such a manner, in a case of using the motion detection sensor 27, it becomes possible to flexibly predict any movement of a camera not limited to a swing behavior. It also becomes possible to predict at the time t=0, which has no previous value. The motion detection sensor 27 may also utilize a motion detection sensor provided to carry out image stabilization and the like in the image pickup device 10.

<3. Wide Angle Image Generation Behavior>

Figure 11:
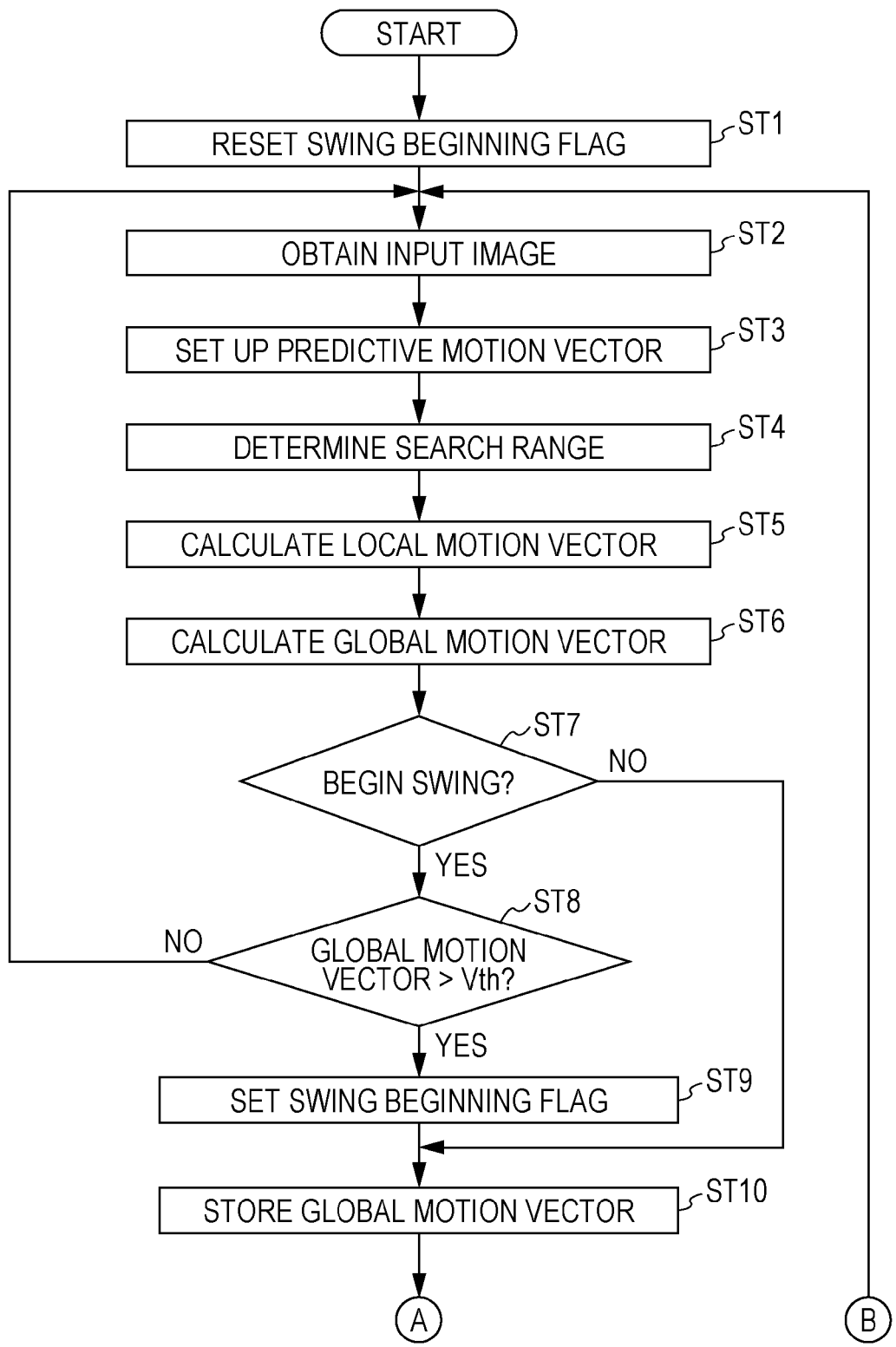
FIG. 11 is a flowchart (No. 1) showing a behavior of an image pickup device.
Figure 12:
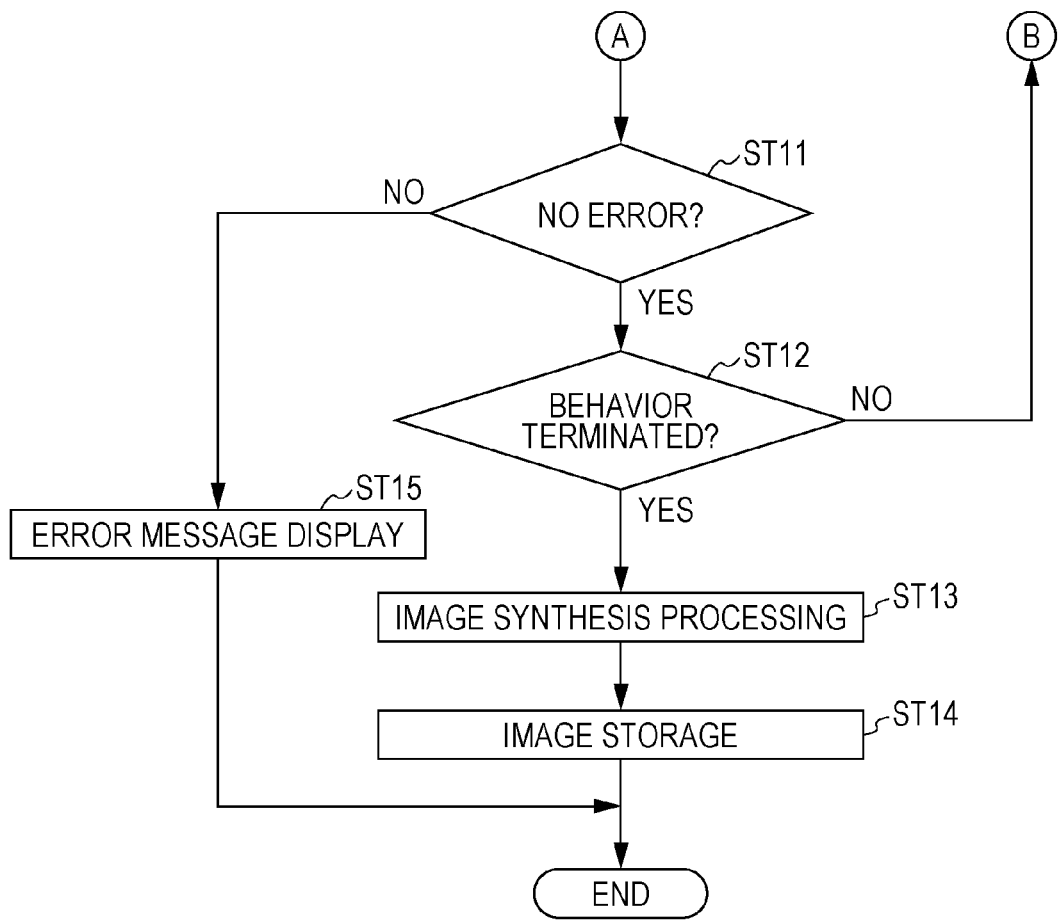
FIG. 12 is a flowchart (No. 2) showing the behavior of the image pickup device.

FIG. 11 and FIG. 12 illustrate a behavior of the image pickup device 10 in a case of carrying out calculation of a local motion vector by setting up a search range based on a predictive motion vector and generating a wide angle image by setting up a partial image using a global motion vector based on the calculated local motion vector.

In step ST1, the image pickup device 10 resets a swing beginning flag. The control unit 25 of the image pickup device 10 resets a swing beginning flag showing a beginning of a swing behavior to go on to step ST2.

In step ST2, the image pickup device 10 obtains an input image. The image pickup unit 12 of the image pickup device 10 carries out generation of a picked up image to go on to step ST3.

In step ST3, the image pickup device 10 sets up a predictive motion vector. The predictive motion vector setup unit 19 of the image pickup device 10 carries out a setup of a global motion vector calculated between images in the past and a predictive motion vector using the global motion vector and a function value to go on to step ST4.

In step ST4, the image pickup device 10 determines a search range. The local motion vector calculation unit 17 of the image pickup device 10 moves a position on a reference image, which is equivalent to a position of a target block on a target image, based on the predictive motion vector set up in step ST3. The local motion vector calculation unit 17 also determines a search range on the basis of a position after movement to go on to step ST5.

In step ST5, the image pickup device 10 calculates a local motion vector. The local motion vector calculation unit 17 of the image pickup device 10 carries out matching process of an image in the target block on the target image with an image in the search range on the reference image and detects a most highly correlated position to calculate a motion vector of the target block. The local motion vector calculation unit 17 also calculates a local motion vector for each target block on the target image to go on to step ST6.

In step ST6, the image pickup device 10 carries out calculation of a global motion vector. The global motion vector calculation unit 18 of the image pickup device 10 calculates a global motion vector, which is a motion vector between the target image and the reference image, from the local motion vector calculated for each target block to go on to step ST7.

In step ST7, the image pickup device 10 judges whether swing is begun. The control unit 25 of the image pickup device 10 judges whether or not a swing behavior is begun, and in a case of judging a swing behavior is begun, it goes on to step ST8, and in a case of judging a swing behavior is not begun, it goes on to step ST10. A beginning of a swing behavior is judged based on, for example, by carrying out motion detection of the image pickup device 10 by a motion detection sensor, the result of motion detection. It is also possible to judge a beginning of a swing behavior in a case that a predetermined period of time is passed since a shutter operation is carried out.

In step ST8, the image pickup device 10 judges whether the calculated global motion vector exceeds a threshold.

The control unit 25 of the image pickup device 10 goes back to step ST2 when the global motion vector does not exceed the threshold, and goes on to step ST9 when the global motion vector exceeds the threshold. That is, the control unit 25 goes on to step ST9 as it judges that a swing behavior is carried out actually when a swing behavior is carried out and the global motion vector between images exceeds the threshold.

In step ST9, the image pickup device 10 sets a swing behavior beginning flag. The control unit 25 of the image pickup device 10 sets a swing beginning flag showing a beginning of a swing behavior to go on to step ST10.

In step ST10, the image pickup device 10 stores the global motion vector. The control unit 25 of the image pickup device 10 stores the calculated global motion vector so as to enable a setup of a predictive motion vector in the predictive motion vector setup unit 19 to go on to step ST11. The global motion vector may also be stored in the predictive motion vector setup unit 19, and may also be stored in the memory unit 16 or the like.

In step ST11, the image pickup device 10 judges whether an error occurs. The control unit 25 of the image pickup device 10 judges whether or not an error occurs in generation of a wide angle image by reliability of the calculated local motion vectors or the global motion vector and the motion detection result of the motion detection sensor. The control unit 25 goes on to step ST12 in a case of not occurring an error, and goes on to step ST15 in a case of occurring an error.

In step ST12, the image pickup device 10 judges whether the behavior is terminated. The control unit 25 of the image pickup device 10 goes on to step ST13 in a case that the behavior is terminated. For example, the control unit 25 goes on to step ST13 in any of a case that a shutter pressing down operation is terminated, a case that the global motion vector falls below a predetermined value for the first time, and a case that the size of an assumed wide angle image exceeds a predetermined size. The control unit 25 goes back to step ST2 in a case that the behavior is not terminated.

In step ST13, the image pickup device 10 carries out image synthesis processing. The image synthesis unit 20 of the image pickup device 10 sets up regions of partial images based on the calculated global motion vector so as to make linkage portions to be continuous when linking partial images. Further, when an already generated image or partial image is a second partial image, the image synthesis unit 20 carries out synthesis processing of linking the image in the region of the partial image set up to the first partial image and generates a wide angle image to go on to step ST14.

In step ST14, the image pickup device 10 stores the image. The image pickup device 10 makes the memory unit 16 store the generated wide angle image therein and terminates the process.

In step ST15, the image pickup device 10 carries out an error message display. The image pickup device 10 displays a message related to an error occurred in, for example, the display unit 23 and terminates the process.

A swing beginning flag is set when the calculated global motion vector becomes larger than a threshold, that is, when a swing behavior of the image pickup device 10 is carried out actually and the swing speed becomes at a speed in accordance with a threshold or faster. Accordingly, whether or not a swing behavior is carried out actually can be judged by the swing beginning flag.

In an application of moving an image pickup direction while continuously shooting by an image pickup device to generate a wide angle image or the like, in the perspective of usability, it is desirable that a global motion vector can be calculated in real time while keeping the speed of moving the image pickup direction of the image pickup device (for example, a swing speed, a parallel displacement rate, or the like of the image pickup device) at a certain speed or faster. In other words, the assumed displacement is desirably large, and in addition, an increase of the processing time is not easily allowed. Here, in an embodiment of the present technology, by setting up a search range using a predictive motion vector in calculation of a local motion vector used for calculation of a global motion vector, it becomes possible to calculate a local motion vector without setting up a redundantly wide search range. Accordingly, the scale of hardware does not have to be enlarged and the processing time for calculation of a local motion vector can be shortened. For this reason, without lowering the usability, generation of a wide angle image good in image quality becomes possible.

Further, it is also effective to a case of generating a super wide angle image from any motion of the image pickup device not only in an application generating a wide angle image by moving the image pickup direction left and right or up and down while continuously shooting by the image pickup device. In addition, not only generation of a wide angle image, it is also applicable to technological fields to which a wide angle shooting is applied, such as scene recognition and three dimensional measurement.

The series of processing described in the specification can be executed by hardware, software, or a combined configuration of both. In a case of executing a process by software, it is executed by installing a program having a processing sequence recorded therein in a memory in a computer built in dedicated hardware. Alternatively, it can be executed by installing a program in a general purpose computer possible to execute various processes.

For example, the program can be recorded in advance in a hard disk, as a recording medium, or a ROM (read only memory). Alternatively, the program can be stored (recorded) temporarily or persistently in a removable recording medium, such as a flexible disk, a CD-ROM (compact disc read only memory), an MO (magneto optical) disk, a DVD (digital versatile disc), a magnetic disk, and a semiconductor memory. Such a removable recording medium can be provided as so-called packaged software.

The program is, other than installed in a computer from a removable recording medium as described above, wirelessly transferred to a computer from a download site or is wire transferred to a computer over a network, such as a LAN (local area network) or the Internet. A computer can receive the program transferred in such a manner and install it in a recording medium, such as a built-in hard disk.

In addition, embodiments of the present technology should not be understood by being limited to the embodiments described above. For example, a motion of the image pickup device is not limited to a swing behavior but may also be a parallel displacement behavior or the like. These embodiments disclose embodiments of the present technology in the form of exemplifications, and it is apparent that those skilled in the art can modify or substitute the embodiments without departing from the spirit of embodiments of the present technology. That is, in order to determine the spirit of embodiments of the present technology, one should make allowance for the appended claims.

The present disclosure contains subject matter related to that disclosed in Japanese Priority Patent Application JP 2011-010783 filed in the Japan Patent Office on Jan. 21, 2011, the entire contents of which are hereby incorporated by reference.

What is claimed is:

1. An image processing device comprising:
a microcomputer operable to:
calculate a plurality of motion vectors for each of a plurality of target blocks set up in a current target image, wherein the plurality of motion vectors are calculated by detecting a plurality of block positions corresponding to each of the plurality of target blocks in a search range set up in a current reference image, wherein the plurality of block positions are maximally correlated with each of the plurality of target blocks;
calculate an inter-image motion vector between the current target image and the current reference image based on the plurality of motion vectors for each of the plurality of target blocks set up in the current target image; and
set up a predictive motion vector for the current target image based on a plurality of inter-image motion vectors calculated between a plurality of target images and a plurality of reference images in further past than the current target image,
wherein the search range is set up on the current reference image based on a position of a target block from the plurality of target blocks and the predictive motion vector.

2. The image processing device according to claim 1, wherein the microcomputer is operable to:
move a first block position from the plurality of block positions on the current reference image based on the predictive motion vector, wherein the first block position is equivalent to the position of the target block on the current target image; and
set up the search range based on a second block position after movement.

3. The image processing device according to claim 1, wherein the microcomputer is further operable to:
setup a function value, wherein
the predictive motion vector is set up by adding the function value as an offset component to the inter-image motion vector.

4. The image processing device according to claim 3, wherein a picked up image is an image generated by moving the image processing device in an image pickup direction, and the function value corresponds to a function approximating a motion to move in the image pickup direction.

5. The image processing device according to claim 3, wherein the function value is a constant value.

6. The image processing device according to claim 3, wherein the function value corresponds to a function linearly changing relative to time.

7. The image processing device according to claim 3, wherein the function value corresponds to a function parabolically changing relative to time.

8. The image processing device according to claim 3, wherein the microcomputer is further operable to:
generate an operational signal in accordance with a user operation, wherein
a sign of an initial value of the function value is set based on the operational signal.

9. The image processing device according to claim 1, wherein the microcomputer is operable to set up the predictive motion vector using the inter-image motion vector calculated in the past.

10. The image processing device according to claim 9, wherein the microcomputer is operable to carry out linear prediction using the inter-image motion vector calculated in the past to set up the predictive motion vector using a result of the linear prediction.

11. The image processing device according to claim 1, further comprising:
a motion detection sensor configured to detect a motion of the image processing device generating the current target image and the current reference image,
wherein the microcomputer is configured to set up the predictive motion vector based on the detected motion of the image processing device.

12. The image processing device according to claim 11, wherein the motion detection sensor is configured to detect one or more of: an angular velocity, acceleration, and magnetism.

13. The image processing device according to claim 1, wherein the microcomputer is further operable to:
set up partial images based on the calculated inter-image motion vector; and
generate a wide angle image by linking the partial images.

14. An image processing method comprising:
calculating a plurality of motion vectors for each of a plurality target blocks set up in a current target image, wherein the plurality of motion vectors are calculated by detecting a plurality of block positions corresponding to each of the plurality of target blocks in a search range set up in a current reference image, wherein the plurality of block positions are maximally correlated with each of the plurality of target blocks;
calculating an inter-image motion vector between the current target image and the current reference image based on the plurality of motion vectors for each of the plurality of target blocks set up in the current target image; and
setting up a predictive motion vector for the current target image based on a plurality of inter-image motion vectors calculated between a plurality of target images and a plurality of reference images in further past than the current target image, wherein the search range is set up on the current reference image based on a position of a target block from the plurality of target blocks and the predictive motion vector.

15. A non-transitory removable recording medium storing a program that, when executed by a processor, performs the steps comprising:

calculating a plurality of motion vectors for each of a plurality target blocks set up in a current target image, wherein the plurality of motion vectors are calculated by detecting a plurality of block positions corresponding to each of the plurality of target blocks in a search range set up in a current reference image, wherein the plurality of block positions are maximally correlated with each of the plurality of target blocks;

calculating an inter-image motion vector between the current target image and the current reference image based on the plurality of motion vectors for each of the plurality of target blocks set up in the current target image; and setting up a predictive motion vector for the current target image based on a plurality of inter-image motion vectors calculated between a plurality of target images and a plurality of reference images in further past than the current target image; and setting up the search range on the current reference image based on a position of a target block from the plurality of target blocks and the predictive motion vector.

* * * * *